United States Patent
Sone et al.

(10) Patent No.: US 9,632,264 B2
(45) Date of Patent: Apr. 25, 2017

(54) OPTICAL TRANSCEIVER WITH PLUG IN ONE OF PAIRED OPTICAL PORTS

(71) Applicant: Sumitomo Electric Industries, Ltd., Osaka-shi (JP)

(72) Inventors: Hidemi Sone, Yokohama (JP); Hiromi Kurashima, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 44 days.

(21) Appl. No.: 14/636,707

(22) Filed: Mar. 3, 2015

(65) Prior Publication Data

US 2015/0249503 A1    Sep. 3, 2015

(30) Foreign Application Priority Data

Mar. 3, 2014 (JP) ................................ 2014-040611

(51) Int. Cl.
*G02B 6/36* (2006.01)
*G02B 6/42* (2006.01)
*H01R 13/443* (2006.01)

(52) U.S. Cl.
CPC ......... *G02B 6/4246* (2013.01); *G02B 6/4261* (2013.01); *G02B 6/4292* (2013.01); *H01R 13/443* (2013.01)

(58) Field of Classification Search
CPC .. G02B 6/4246; G02B 6/4261; G02B 6/4292; H01R 13/443
USPC .................. 385/53–54, 88–94; 398/135–139
See application file for complete search history.

(56) References Cited

U.S. PATENT DOCUMENTS

| | | | | |
|---|---|---|---|---|
| 4,979,792 A * | 12/1990 | Weber | ................ | G02B 6/3831 385/139 |
| 5,111,497 A * | 5/1992 | Bliven | ................ | H01R 13/443 361/679.32 |
| 5,243,678 A * | 9/1993 | Schaffer | ............... | G02B 6/4292 385/134 |
| 6,088,502 A * | 7/2000 | Faist | .................... | G02B 6/3849 385/134 |
| 6,494,623 B1 * | 12/2002 | Ahrens | ................ | G02B 6/4292 385/76 |
| 6,516,129 B2 * | 2/2003 | Chan | ........................ | G02B 6/42 349/38 |
| 7,033,191 B1 * | 4/2006 | Cao | ....................... | G02B 6/3847 439/157 |
| 7,706,657 B1 * | 4/2010 | McQuiggan | ......... | G02B 6/3825 385/134 |
| 8,104,977 B2 * | 1/2012 | Sone | ...................... | H04B 10/40 385/139 |
| 2003/0002837 A1 * | 1/2003 | Chan | ........................ | G02B 6/42 385/134 |

(Continued)

FOREIGN PATENT DOCUMENTS

JP    2004-012835 A    1/2004

*Primary Examiner* — Ryan Lepisto
*Assistant Examiner* — Guy Anderson
(74) *Attorney, Agent, or Firm* — Venable LLP; Michael A. Sartori; F. Brock Riggs (57) ABSTRACT

An optical transceiver having a bi-directional optical subassembly (BOSA) and a twin optical port is disclosed. The BOSA is installed with respect to one of the twin port, and a plug is plugged within the other of the twin port. The plug, which is made of resin material, is rigidly set in the other of the twin port and reliably prohibited from slipping out from the port.

10 Claims, 14 Drawing Sheets

(56) References Cited

U.S. PATENT DOCUMENTS

| | | | |
|---|---|---|---|
| 2003/0185499 A1* | 10/2003 | Butler | G02B 6/425 385/24 |
| 2006/0078259 A1* | 4/2006 | Fuchs | G02B 6/4201 385/88 |
| 2007/0066248 A1* | 3/2007 | Ka | G02B 6/4292 455/90.3 |
| 2007/0230878 A1 | 10/2007 | Nakazawa et al. | |
| 2010/0081303 A1* | 4/2010 | Roth | G02B 6/3817 439/140 |
| 2013/0071072 A1* | 3/2013 | Xie | G02B 6/4277 385/92 |
| 2015/0295338 A1* | 10/2015 | Drake | H01R 13/443 439/148 |

* cited by examiner

*Fig. 14C*

OPTICAL TRANSCEIVER WITH PLUG IN ONE OF PAIRED OPTICAL PORTS

BACKGROUND

1. Field of the Invention

The present application relates to an optical transceiver, in particular, the application relates to an optical transceiver providing a pair of optical ports, one of which is covered with plug.

2. Background Arts

One type of optical transceiver is known in the field where the optical transceiver provides a bi-directional optical sub-assembly (BOSA) and a pair of optical ports, only one of which is coupled with the BOSA and the other ports are sealed to prevent an external optical connector from mating therewith. The present application proposes one type of a component to seal the port uncoupled with the BOSA.

SUMMARY OF THE INVENTION

An aspect of the present invention relates to an optical transceiver, which comprises an optical receptacle having a pair of ports, a bi-directional optical sub-assembly (BOSA) set in one of the paired ports, and a plug plugged in another of the paired ports. The plug has a hammer abutting against a wall of an opening provided in the optical receptacle to prevent the plug from slipping out from another of the paired ports.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF EMBODIMENTS (First Embodiment)

Some embodiments according to the present application will be described as referring to drawings. In the description of the drawings, numerals or symbols same with or similar to each other will refer to elements same with or similar to each other without duplicated explanations.

Figure 1:
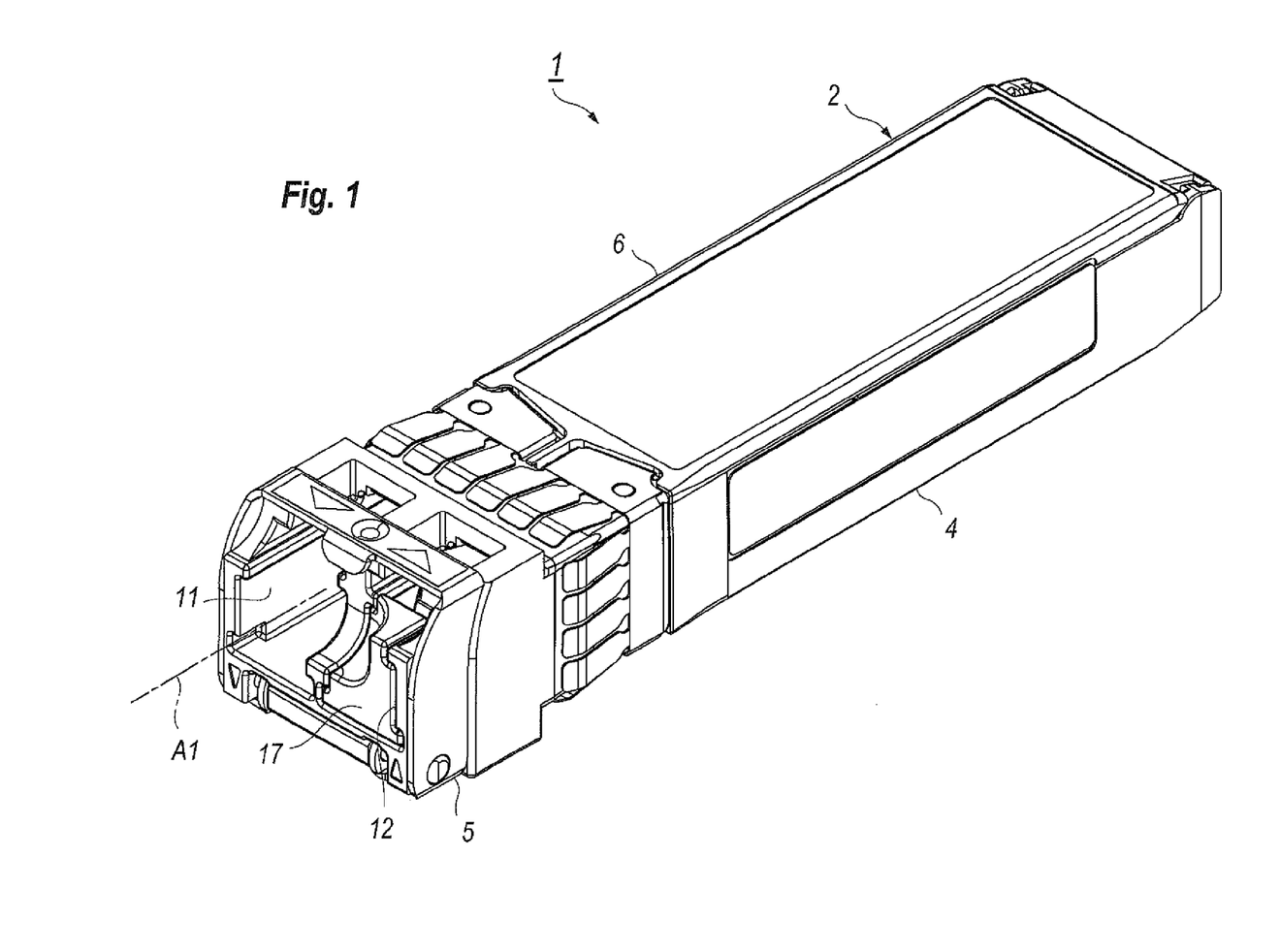
FIG. 1 is an outer appearance of an optical transceiver according to the embodiment of the present invention.

FIG. 1 is an outer appearance of an optical transceiver according to an embodiment of the present invention. As shown in FIG. 1, the optical transceiver 1 of the present embodiment has a rectangular housing whose longitudinal direction is in parallel to the optical axis A1. The housing 2 comprises a top housing 6 and a bottom housing 4 assembled with the top housing 6. Two housings, 4 and 6, form a cavity into which electrical components and optical components are installed.

Figure 2:
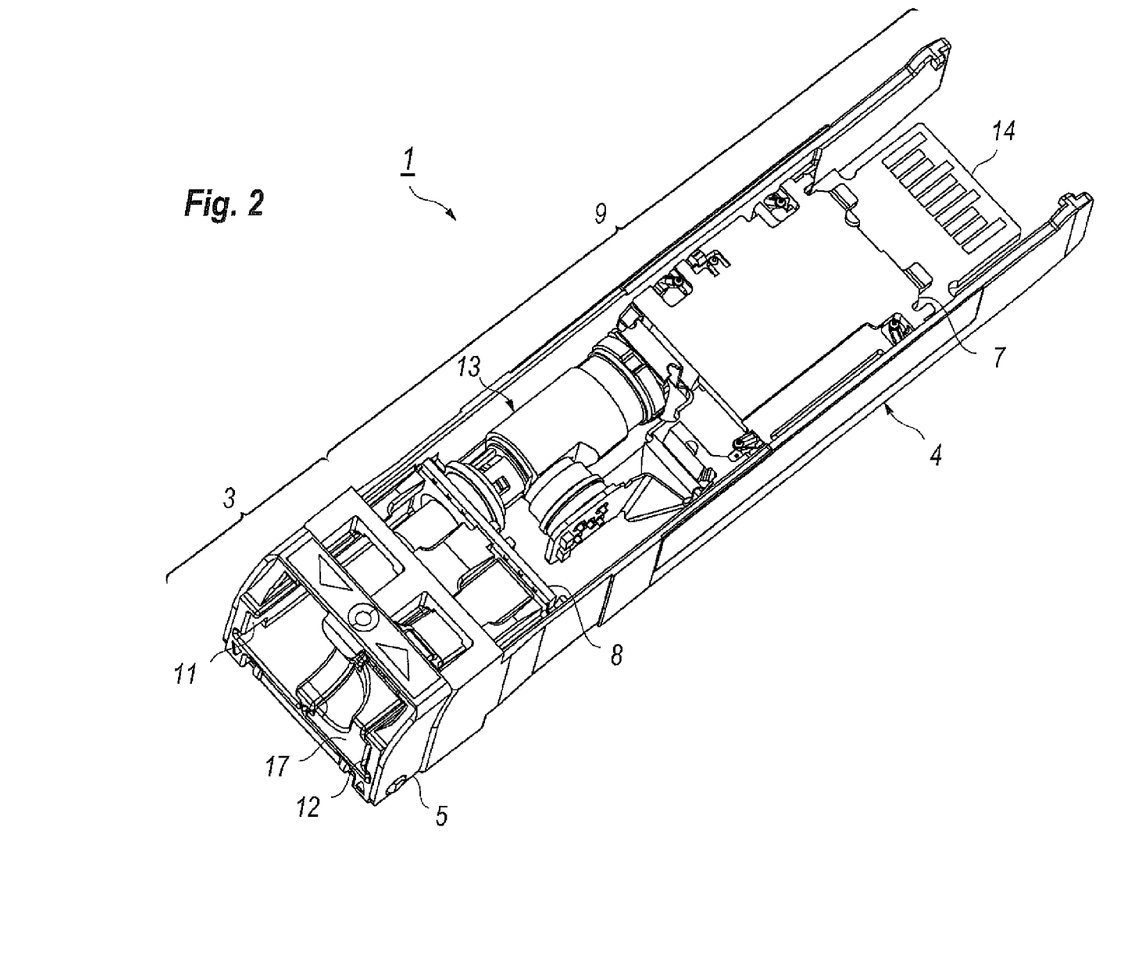
FIG. 2 shows an inside of the bottom housing as removing the top housing.
Figure 3:
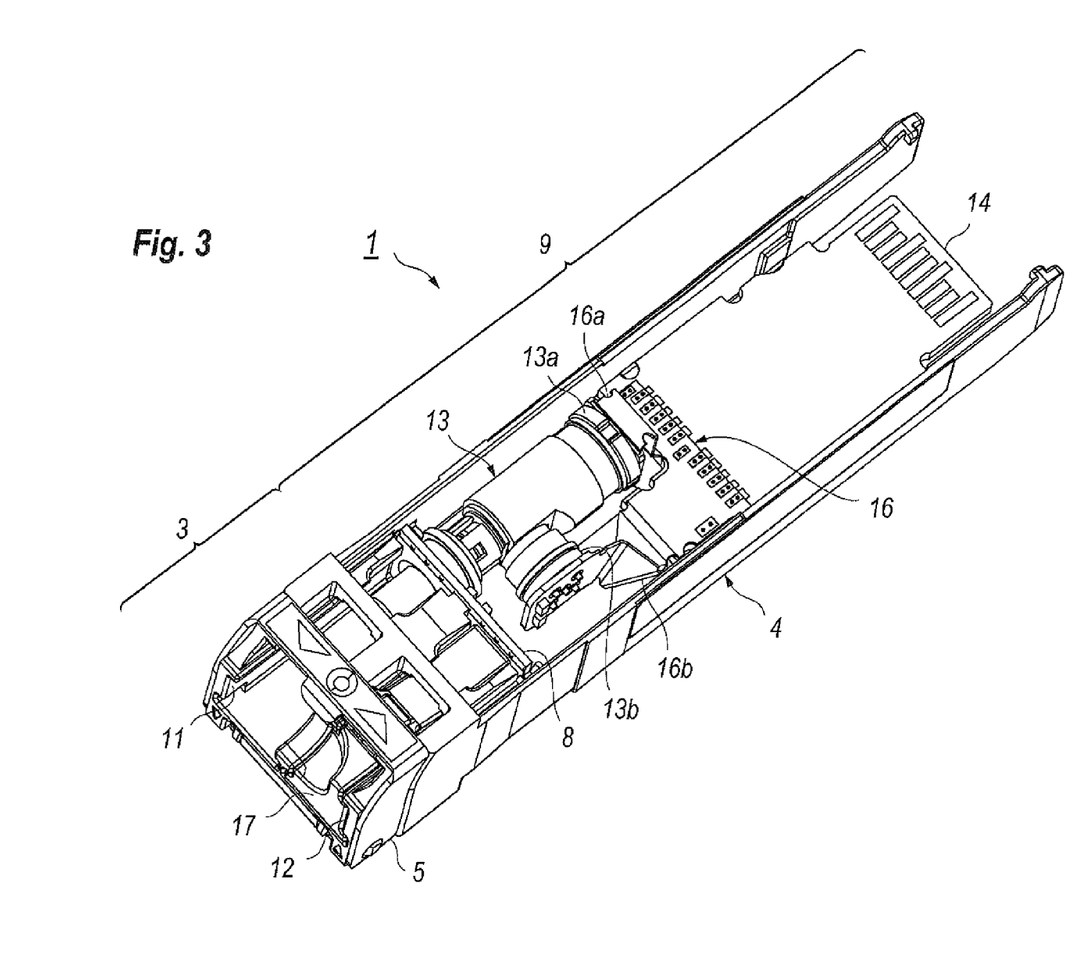
FIG. 3 also shows an inside of the bottom housing.

FIGS. 2 and 3 show an inside of the bottom housing 4 by removing the top housing 6. As shown in FIGS. 2 and 3, the bottom housing 4 provides a body portion 9 and an optical receptacle 3. The body portion 9 and the optical receptacle 3 are arranged along the longitudinal direction of the housing 2. The body portion 9 installs two circuit boards between which a holder 7 is mounted. FIG. 3 omits the holder 7. An interface between the body portion 9 and the optical receptacle 3 provides a shield plate 8 made of metal to shield the inside of the body portion 9. In the description below, a direction "forward" or "front" corresponds to a side where the optical receptacle 3 is formed, while, another direction "rear" or "back" corresponds to a side where the holder 7 is mounted.

The optical receptacle 3 provides two ports, 11 and 12. When an optical transceiver 1 has a type of the bi-directional transceiver that transmits and receives optical signals to and from a single fiber, respectively, like the present embodiment, one of the port 11 has functions of transmitting an optical signal and receiving another optical signal, but the other port 12 becomes a dummy port. On the other hand, the optical fiber has a function that the optical transmission and the optical reception are carried out with respect to respective fibers independent to the others, the first port 11 is provided for the optical transmission, and the second port 12 provides the function of the optical reception.

The body portion 9 installs a bi-directional optical sub-assembly (BOSA) 13 and a printed circuit board (PCB) 14 that mounts electronic circuits to communicate with the BOSA. The BOSA 13 is electrically connected to the PCB 14 by a flexible printed circuit (FPC) board 16.

Figure 4:
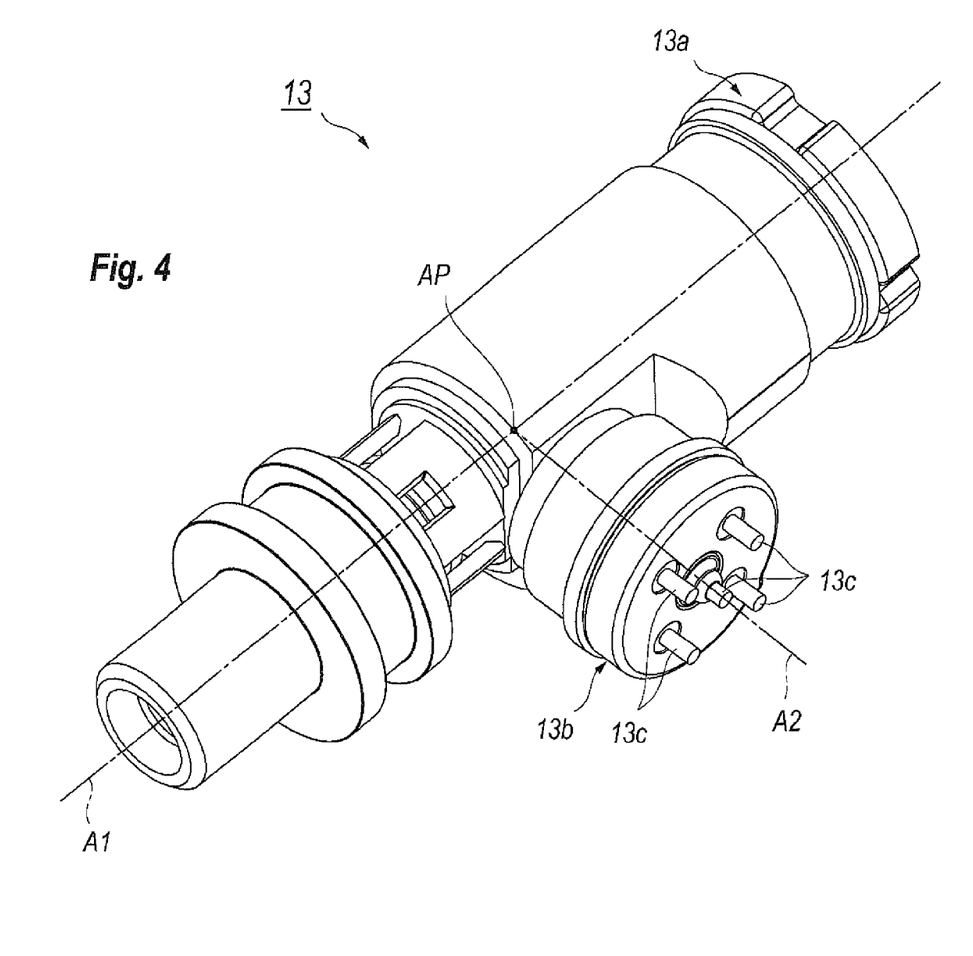
FIG. 4 is a perspective view of the bi-directional optical sub-assembly (BOSA)

FIG. 4 is a perspective view of the BOSA 13. The BOSA 13 has a cylindrical body with an axis A1, where a transmitter device 13a is provided as aligning the optical axis thereof with the axis A1. A receiver device 13b, which also has a cylindrical shape, is provided along an axis A2 intersecting with, or perpendicular to the former axis A1. Some lead terminals 13c extend along the axis A2. Other lead terminals, which are not illustrated in FIG. 4, extend from the transmitter device 13a along the axis A1. Although not illustrated in FIG. 4, a point AP at which two axes, A1 and A2, intersect arranges a wavelength selective filter. That is, the wavelength selective filter transmits an optical signal provided from the transmitter device 13a to an external fiber set in the port 11, and reflects another optical signal provided from the external fiber toward the receiver device 13b. Thus, the bi-directional function with respect to the single fiber may be realized.

Referring to FIG. 3 again, the FPC board 16 is split into two portions, one of which 16a is connected to the transmitter device 13a and the other 16b is connected to the receiver device 13b, but collectively connected to the PCB 14. The portion 16a of the FPC 16 extends from the edge of the PCB 14 to the transmitter device 13a as bending thrice to form a U-shaped side view. That is, the FPC 16a is bent upward at an edge of the splitting, bent forward and bent downward to form the U-shape. The other FPC 16b is twisted between the edge of the splitting and the receiver device 13b because the axis A2 for the receiver device 13b makes a right angle against the axis A1.

As already described, the optical transceiver 1 of the present embodiment is the type of the bi-directional transceiver for the single fiber, the second port 12 is the dummy port. Accordingly, it is preferable to avoid the miss-insertion into the second port 12 of an external optical connector. Also, during the production of the optical transceiver, it should be avoided to miss-assemble of the BOSA in the second port 12. So, the optical transceiver 1 of the present embodiment provides a plug 17 set into the second port 12.

The second port 12 is independent of the transmitter device 13a and the receiver device 13b, that is, the second port is electrically and optically isolated from two devices, 13a and 13b. Accordingly, even when an external optical connector is inserted into the second port 12, optical and electrical components installed in the optical transceiver 1 may receive no influence from such an insertion. Also, optical and electrical components in another optical transceiver coupled with the external connector may also receive no influence even when the optical connector is inserted into the second port 12. The miss-insertion of the optical connector into the second port 12 only brings the interruption of the communication.

Figure 5:
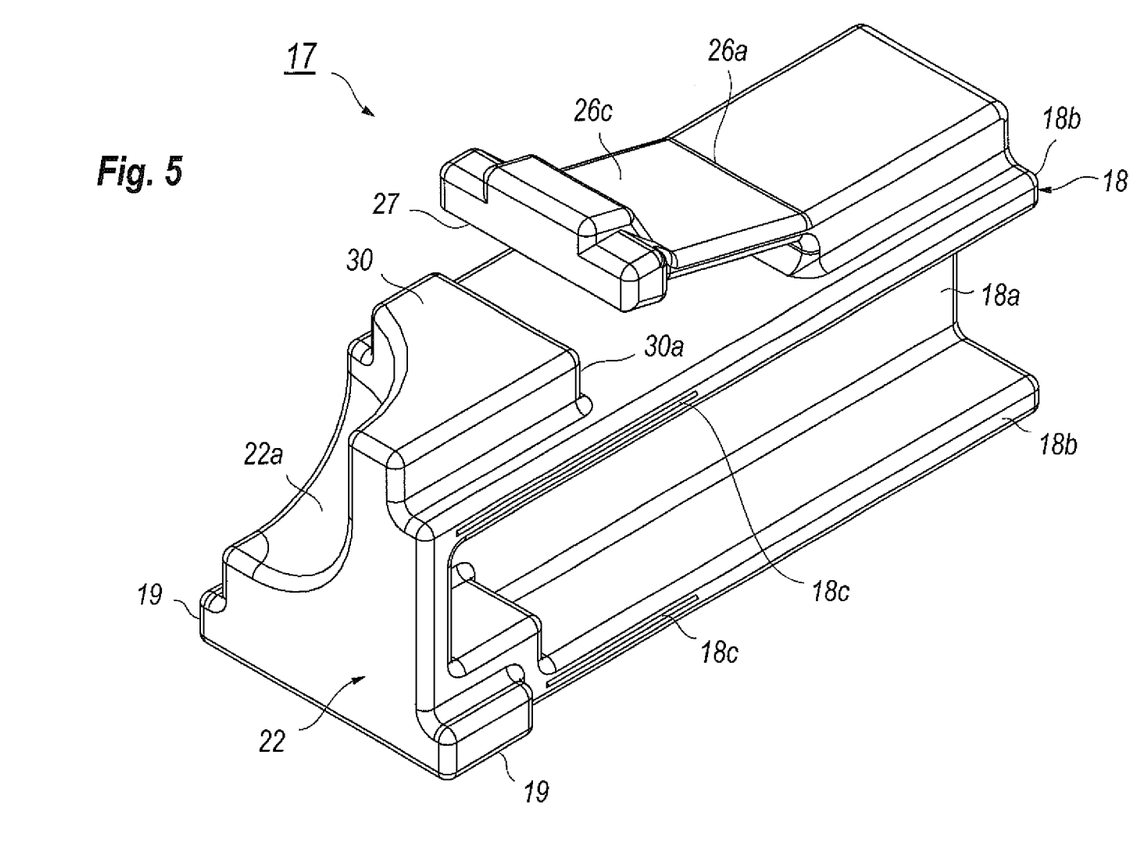
FIG. 5 is a perspective view of the plug.

FIG. 5 is a perspective view of the plug 17. The plug 17 primarily comprises three portions. That is, the plug 17 provides a plug body 18, a knob 19, and a latch 26. The plug body 18 is to be inserted into the second port 12. The knob 19 determines an insertion depth of the plug body 18 into the second port 12, and the latch 26 prevents the plug body 18 from slipping out from the second port 12.

The plug body 18 has a cross section of an H-shape with a center wall 18a and two slabs 18b extending laterally from respective ends of the center wall 18a, but outer dimensions of the plug body 18 are slightly smaller than inner dimensions of the second port 12 by about 10 μm. The respective slabs 18b provide in the ends thereof ribs 18c. The center wall 18a and the slabs 18b form cavities in respective sides of the center wall 18a. The plug 17 of the present embodiment may save resin materials forming the plug 17 without degrading stiffness thereof.

Figure 6:
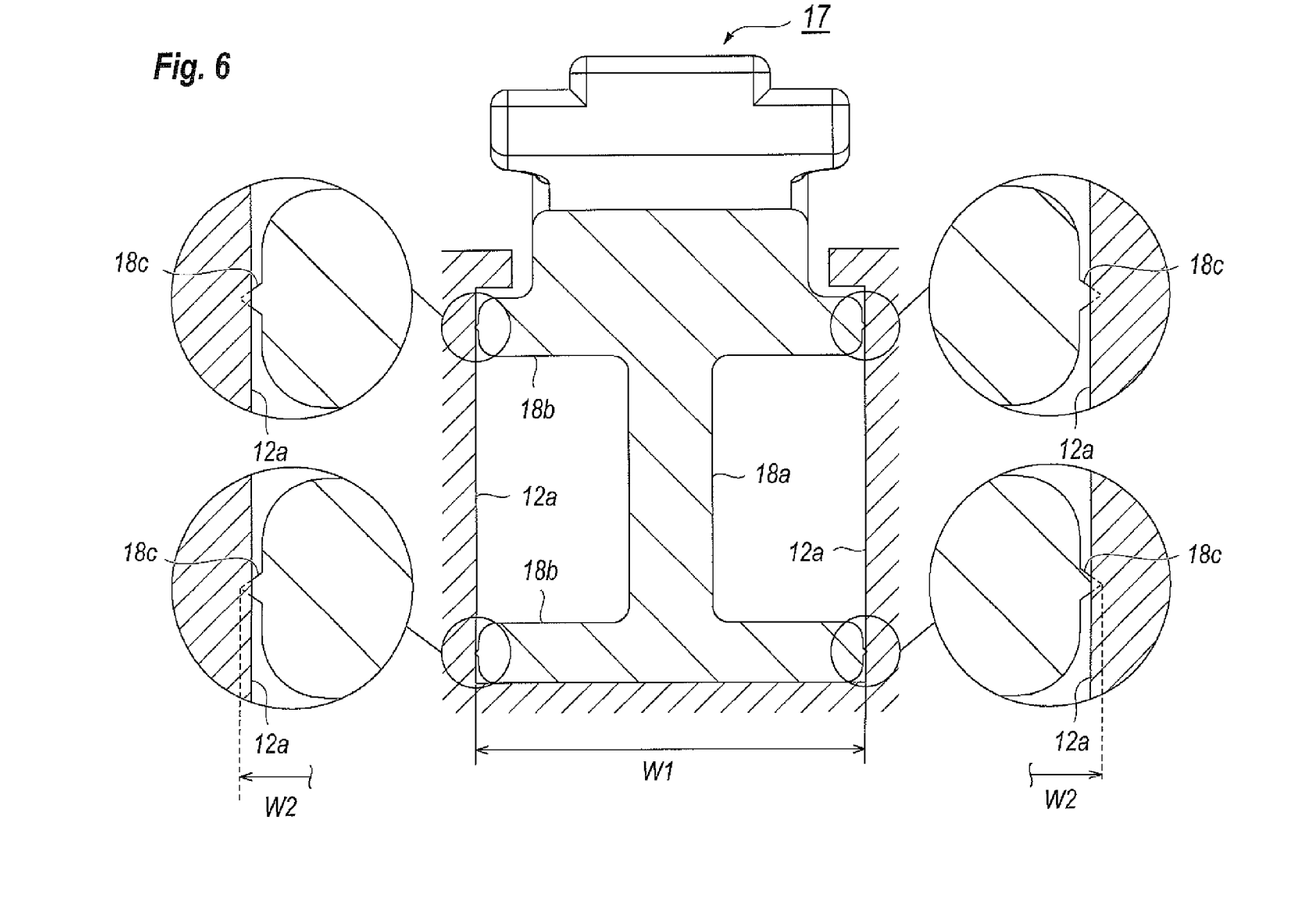
FIG. 6 shows a cross section of the plug plugged into the second port.

FIG. 6 shows a cross section of the plug 17 in a state the plug 17 is plugged into the second port 12. A distance between tips of the ribs 18c provided in respective sides of the slabs 18b is designed to be slightly wider than an inner width W1 of the second port 12 before the plug 17 is set in the second port 12. Moreover, the plug 17 is plugged within the second port 12 as crushing the ribs 18c. Thus, the plug 17 is tightly set in the second port 12 without looseness.

Figure 7:
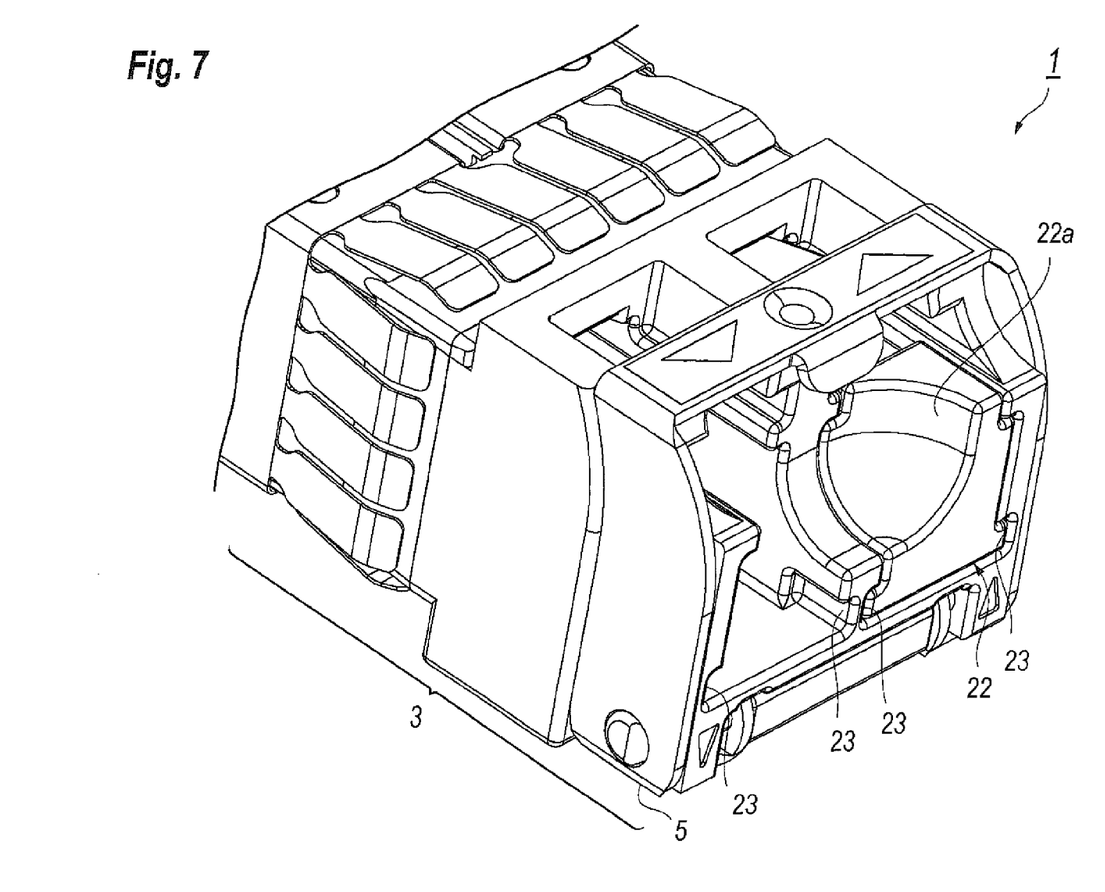
FIG. 7 is a perspective view of the optical receptacle where the plug is set within the second port.

Referring to FIG. 5, the plug 17 provides in the front end thereof a cap 22 including a pocket 22a of a circular hollow. The pocket 22a may facilitate the picking up the bail 5 by fingers when the optical transceiver 1 is pulled out from the cage. The cap 22 also provides the knobs 19 in respective ends to determine the position of the plug 17 in the second port 12 along the longitudinal direction, or the insertion depth of the plug 17 in the second port 12. That is, referring to FIG. 7, which is a perspective view of the optical receptacle 3 where the plug 17 is set in the second port 12, the first and second ports, 11 and 12, each provides a pair of hollows 23 in respective sides thereof. The knobs 19 are set within respective hollows 23. Designing the depth of the hollow 23 and the length of the knob 19 each along the longitudinal direction, the depth of the plug 17 into the second port 12 may be optionally determined.

Figure 8:
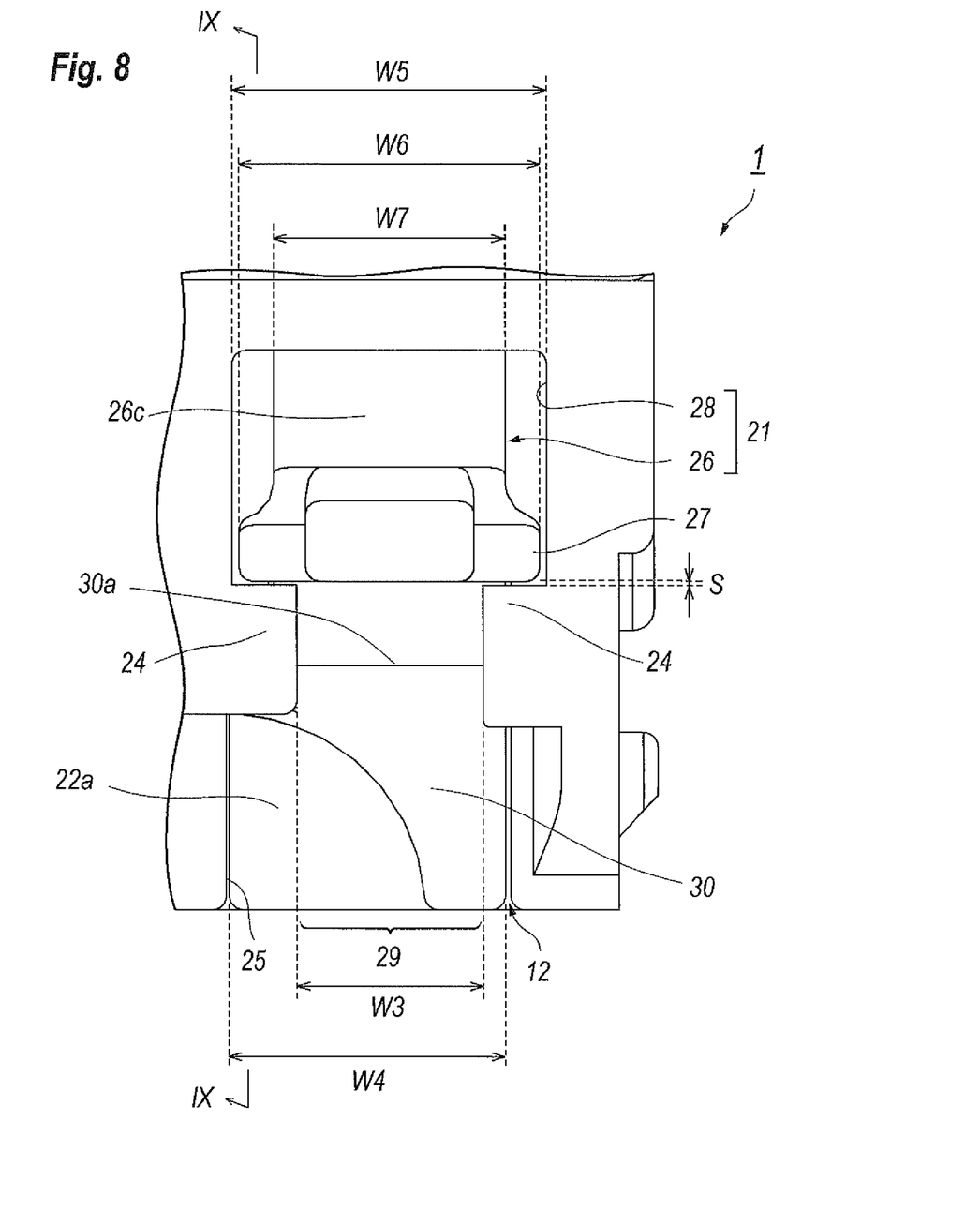
FIG. 8 is a plan view of the second port where the plug is set.

The receptacle 3 needs a function to latch the plug 17, that is, a mechanism to prevent the plug 17 from slipping out from the second port 12. FIG. 8 is a plan view of the second port 12 where the plug 17 is set. As shown in FIG. 8, the optical transceiver 1 of the present embodiment provides such a mechanism 21 including the latch 26 in the plug 17 and an opening 28 in the second port 12 of the receptacle 3. The first port 11 also provides an opening to prevent the optical connector set therein from slipping out from the first port 11.

The second port 12 provides the port 25, into which the plug 17 is set, exposing from the front end of the optical receptacle 3. The port 25 is continued to the opening 28 by a channel 29 with a width of W3. Specifically, the opening 28 in a width W5 thereof is wider than the width W3 of the channel 29, which forms stoppers 24 in respective sides of the channel 29. Also, the width W3 of the channel 29 is narrower than a width W4 of the port 25.

Figure 9:
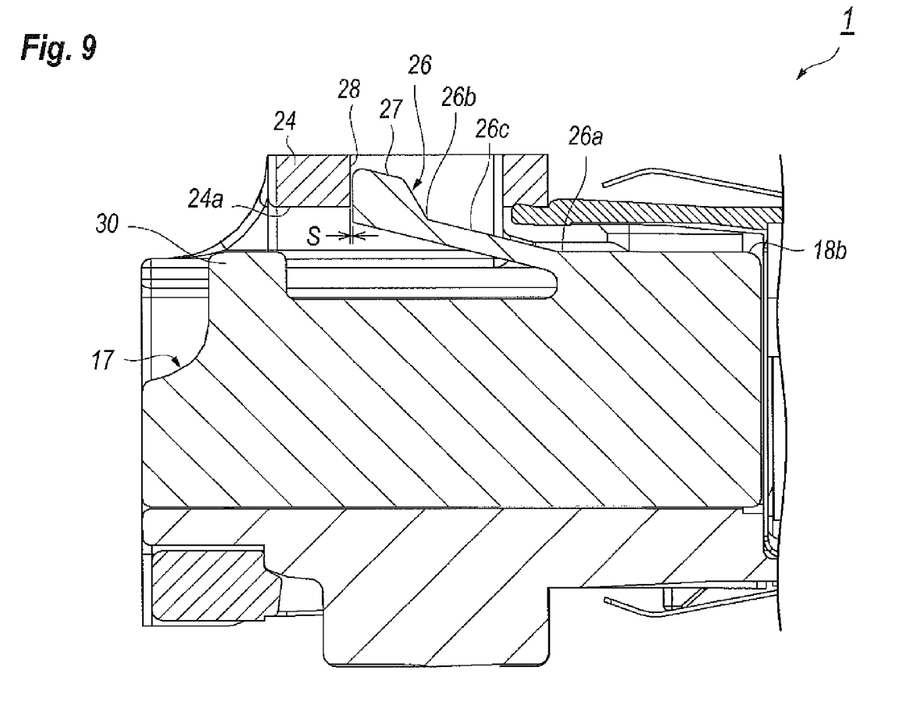
FIG. 9 shows a cross section taken along the line IX-IX appearing in FIG. 8.

FIG. 9 shows a cross section taken along the line IX-IX appearing in FIG. 8. As shown in FIG. 9, the latch 26 of the plug 17, which extends from the slab 18b frontward, has a root 26a continuous from the slab 18b, an arm 26c extending from the root 26a, and a tip 26b in the end of the arm 26c. Because the latch 26 continues to the slab 18b only by the root 26a thereof, and the arm 26c has a thickness thinner than that of the slab 18b, the tip 26b may flap up and down by the root 26a as a fulcrum of the flapping. The tip 26b of the latch 26 provides the hammer 27 abutting against the stopper 24.

Referring to FIG. 8 again, the hammer 27 has a width W6 is larger than a width W7 of the arm 26c of the latch 26 and the width W3 of the channel 29 but slightly narrower than the width W5 of the opening 28. When the plug 17 is set in the second port 12, the hammer 27 is set in the opening 28 and respective sides thereof are in contact with the stopper 24. Inserting the plug 17 into the second port 12, the arm 26c of the latch 26 is easily bent from the root 26a such that the hammer 27 slides on the bottom surface 24a of the stopper 24. Further inserting the plug 17 until the knob 19 abuts against the deep end of the hollow 23, the hammer 27 is apart from the stopper 24 by a gap S therebetween. That is, under such a condition, the tip 26b of the latch 26 and the hammer 27 may recover the original position by the elasticity of the arm 26c. Because the level of the hammer 27 in the original position is higher than the level of the bottom surface 24a of the stopper 24, the hammer 27 abuts against the side surface of the stopper 24, namely, the edge of the opening 28, which effectively prevents the plug 17 from slipping out from the second port 12. The tip 26b and the hammer 27 may be pressed down by a tool through the opening 28 to release the hammer 27 from the stopper 24. However, a specific tool is necessary to press down the hammer 27.

Figure 10:
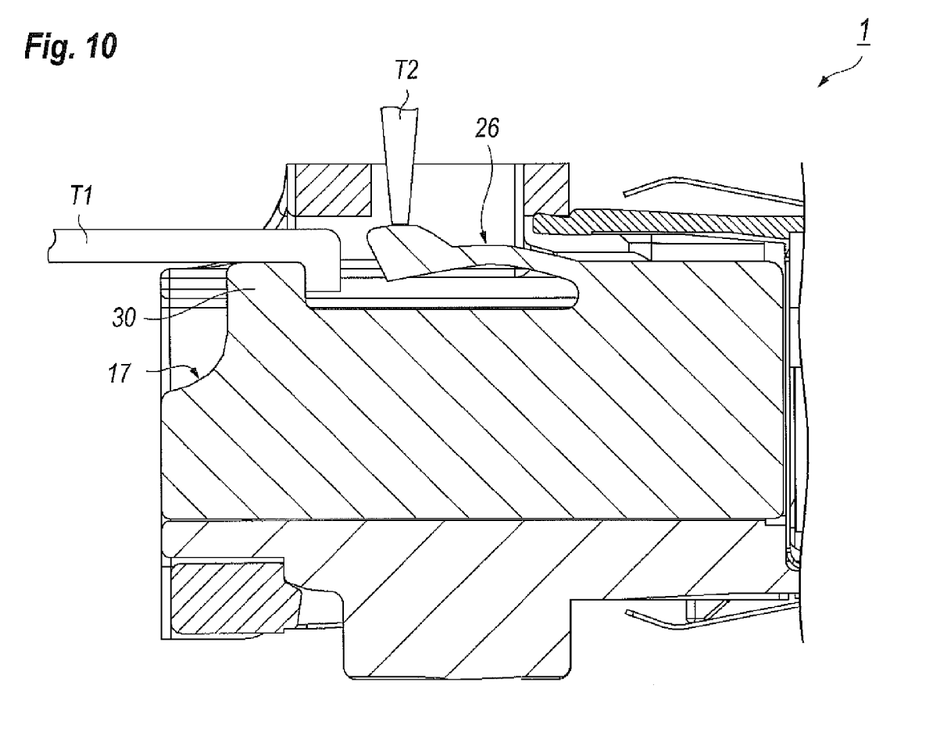
FIG. 10 is a cross section showing a mechanism to disassemble the plug from the optical transceiver.

Recent electronic components and/or electronic apparatus are requested to be recycled when they are casted away. Accordingly, such components and apparatuses are necessary to be easily disassembled and grouped depending on materials constituting them. The plug 17 of the present embodiment, because of the mechanism of the latch 26 and the stopper 24, is hard to be disassembled from the optical transceiver 1. Some specific tools, T1 and T2, shown in FIG.

10 could be helpful to disassemble the plug 17 from the optical transceiver 1. FIG. 10 is a cross section showing a mechanism to disassemble the plug 17 from the optical transceiver 1. The plug 17 provides a terrace 30 to which the tool T1 is hooked. Referring to FIG. 5 again, the terrace 30 is provided in the top of the plug 17 and faces the front end of the hammer 27. The rear edge 30a of the terrace 30 is positioned in the channel 29 with a space against the hammer 27. Accordingly, the tool T1 may be hooked with the edge 30a to pull the plug 17. On the other hand, another tool T2 pushes the hammer 27 and/or the latch 26 downward to release the hammer 27 from the wall of the opening. Thus, the plug 17 is able to be extracted from the second port 12.

The optical transceiver 1 of the present embodiment receives the external optical connector only in the first port 11. The BOSA 13, which provides the transmitter device 13a and the receiver device 13b, optically couples with the single fiber secured in the optical connector. On the other hand, the other port 12 is plugged with the plug 17, and the plug 17 is hard to be split out from the second port because of the hammer 27 abutting against the wall of the opening 28. Accordingly, the miss-insertion of the optical connector may be effectively prevented. The optical receptacle 3 provided in the present optical transceiver 1 has the configuration completely same as that provided in an optical transceiver receiving a pair of optical connectors, one of which is for the optical reception and the other is for the optical transmission. Thus, the optical transceiver 1 of the present embodiment may save the production cost.

(Second Embodiment)

The plug 17 of the former embodiment, as already described, is prevented to be split off from the second port 12 because of the abutting mechanism of the hammer 27 against the wall of the opening 28. However, also already described, a combination of the tools, T1 and T2, one for pulling the plug 17 and the other for pushing the hammer 27, may easily release the plug 17 from the port 12. For instance, a tweezers may push the hammer 27 downward as the tool T2. The second embodiment of the present invention provides an additional mechanism making it harder to remove the plug 17 from the port 12.

Figure 11:
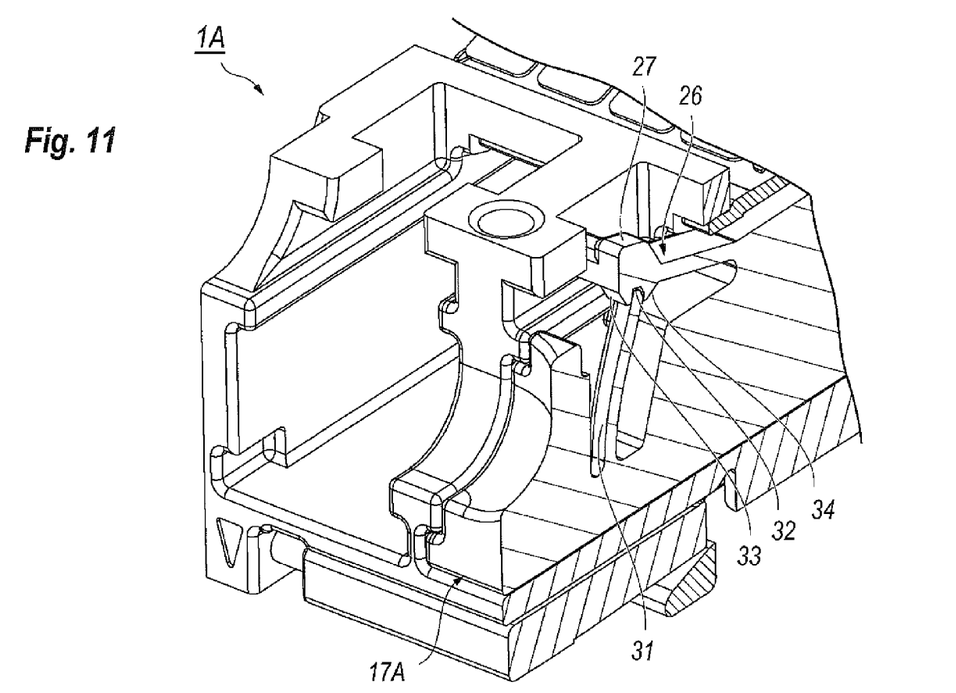
FIG. 11 is a perspective view of a cross section of the port according to the second embodiment.
Figure 12:
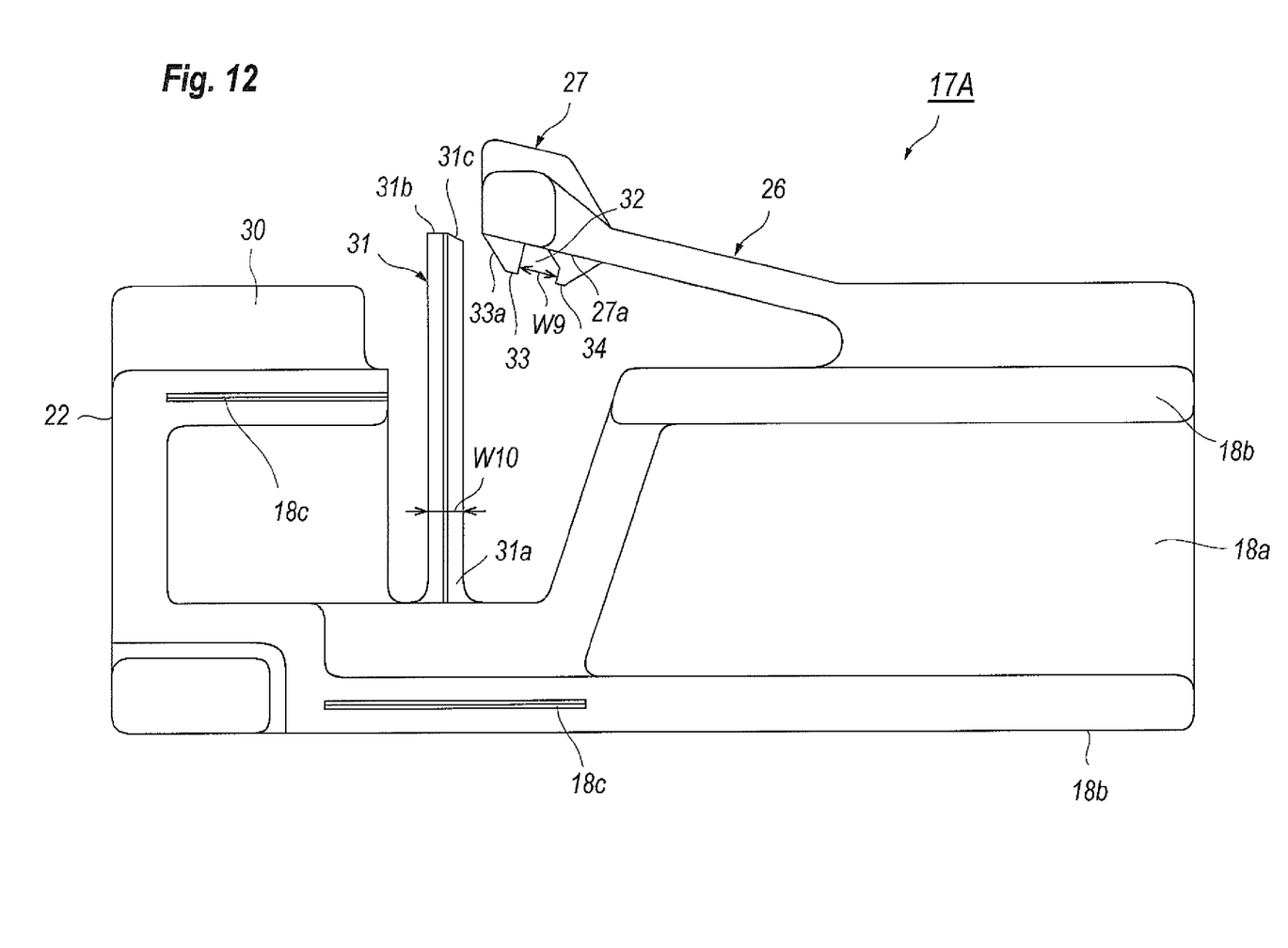
FIG. 12 shows a cross section of the pillar and the hammer accompanied with the latch 26.
Figure 13:
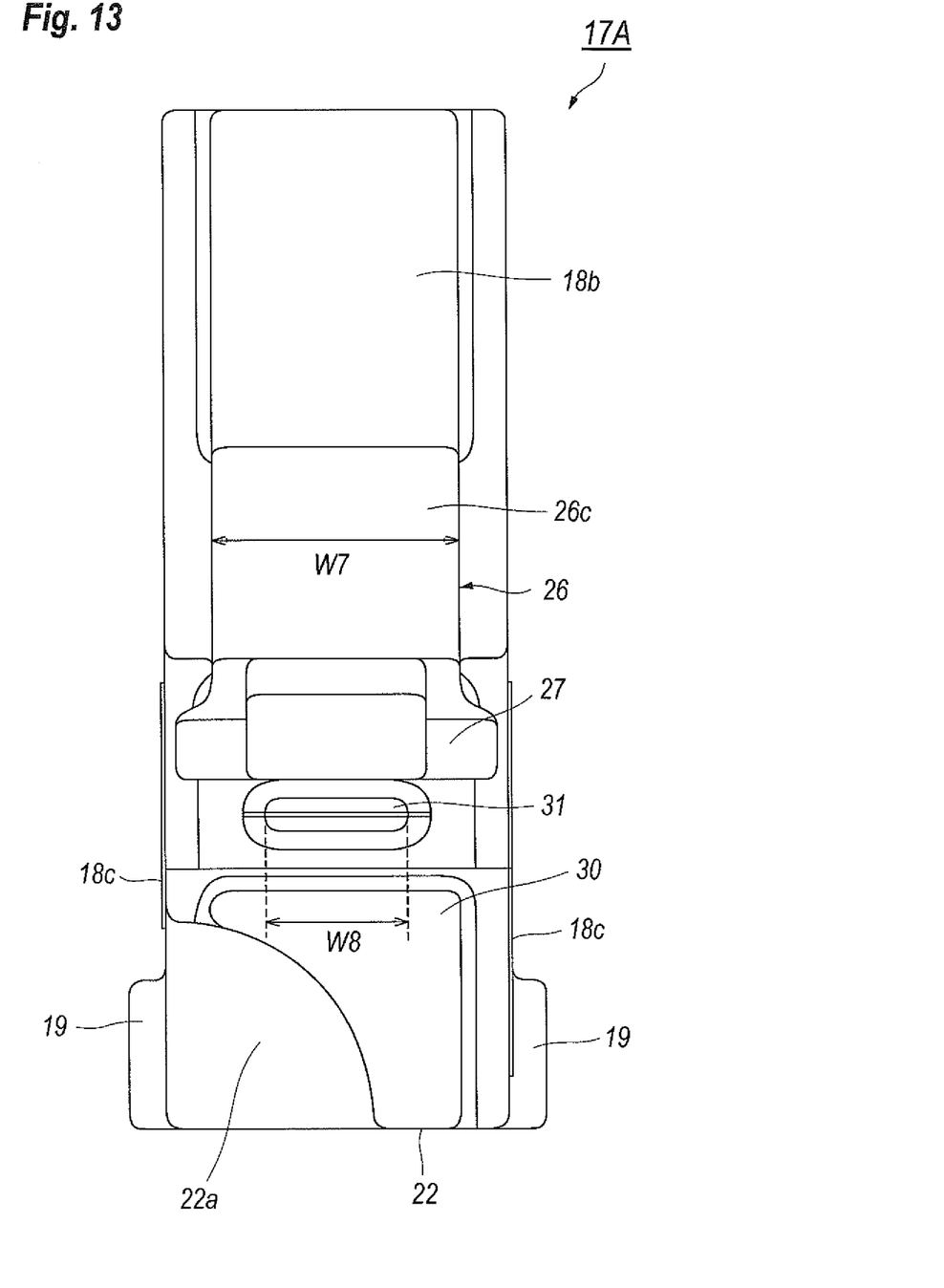
FIG. 13 is a plan view of the plug with the hammer and the pillar.

FIG. 11 is a perspective view of a cross section of the port 12 according to the second embodiment that provides a pillar 31 and a pocket 32 in the hammer 27. FIG. 12 shows a cross section of the pillar 31 and the hammer 27 accompanied with the latch 26, and FIG. 13 is a plan view of the plug 17A with the hammer 27 and the pillar 31. The pillar 31, which is set between the hammer 27 and the cap 22, has a root 31a fixed to the slab 18b and a tip 31b in a level thereof substantially equal to the hammer 27. The tip 31b may flap front and rear by the root 31a as a center of the flapping. Referring to FIG. 13, the pillar 31 has a lateral width W8 narrower than the lateral width W7 of the hammer 27. The tip 31b of the pillar 31 provides a slope 31c inclined toward the hammer 27.

The pocket 32, which is formed by two banks 33 and 34 provided in the back surface 27a of the hammer 27, receives the tip 31b of the pillar 31. The former banks 33 has a slope 33a facing the slope 31c of the pillar 31. The longitudinal width W9 of the pocket 32 between two banks, 33 and 34, is wider than a longitudinal width W10 of the pillar 31. The pillar 31, when the plug 17A is not plugged into the port 12, is free from the hammer 27. That is, the pillar 31 in the tip 31b thereon is in a position not to interrupt the flapping of the hammer 27 by being positioned in front of the hammer 27.

Figure 14A:
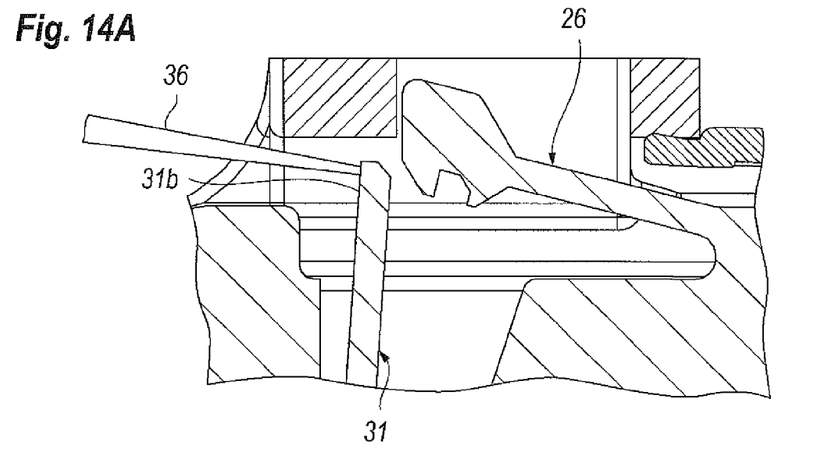
FIGS. 14A to 14C describe manipulation of the pillar after the plug is set within the port.
Figure 14B:
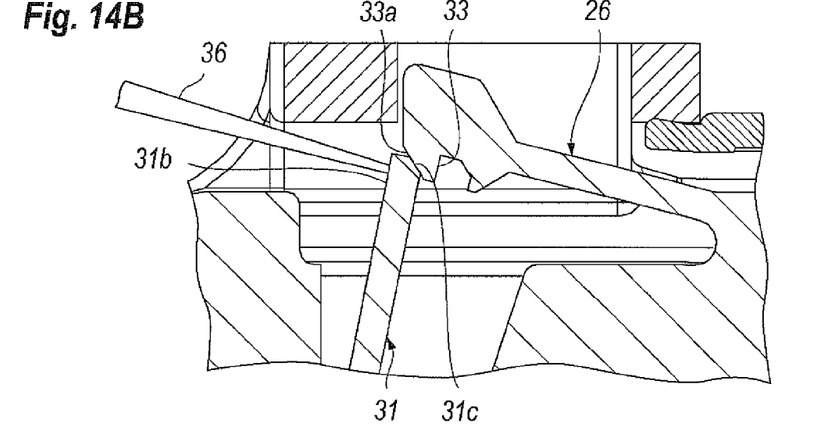
Figure 14C:
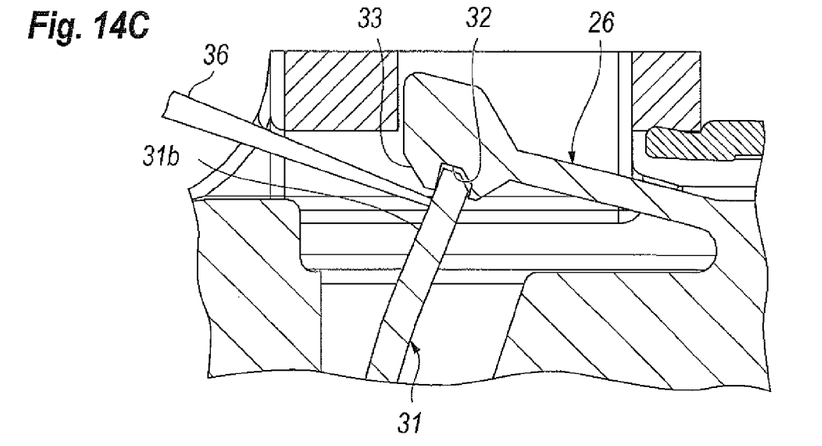

FIGS. 14A to 14C describe manipulation of the pillar 31 after the plug 17A is set within the port 12. As shown in FIG. 14A, a tool 36, which may be a bar and/or a slab, is inserted from a gap between the terrace 30 and the top of the optical receptacle 3, and pushes the pillar 31 rearward. Deforming the pillar 31 toward the hammer 27, the slope 31c in the tip 31b of the pillar 31 comes in contact with the slope 33a of the front bank 33 of the hammer 27, which is shown in FIG. 14B. Further pushing the pillar 31 by the tool 36 in rearward, the slope 31c in the tip 31b of the pillar 31 is slid on the slope 33a of the bank 33, which raises the hammer 27 upward. Finally, the tip 31b of the pillar 31 gets over the bank 33 and is set within the pocket 32, as shown in FIG. 14C. Thus, the pillar 31 is necessary to have a length from the root 31a to the tip 31b such that the tip 31b is stably set within the pocket 32. The pillar 31, once set within the pocket 32, may perfectly prevent the hammer 27 from flapping downward to release the abutment against the wall of the opening 28. The plug 17A is unable to be removed from the port 12 without breaking the pillar 31.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An optical transceiver, comprising:
   an optical receptacle having a pair of ports and an opening formed by a wall thereof;
   a bi-directional optical sub-assembly (BOSA) set with respect to one of the paired ports; and
   a plug plugged in another of the paired ports, the plug having a hammer abutting against the wall of the opening of the optical receptacle, the hammer preventing the plug from slipping out from the another of the paired ports by abutting against the wall,
   wherein the optical receptacle further includes a channel extending from the opening to an end of the another of the paired ports, the hammer having a width greater than a width of the channel but smaller than a width of the opening, and the channel forming stoppers in respective sides of the channel against which the hammer of the plug abuts.

2. The optical transceiver of claim 1,
   wherein the plug provides a terrace with an edge facing the hammer and being exposed in the channel.

3. The optical transceiver of claim 1,
   wherein the plug provides a latch including a root, an arm, and an end, the hammer being provided in the end of the latch, the hammer moving up and down by bending the arm of the latch with the root of the latch as a fulcrum of the bend.

4. The optical transceiver of claim 3,
   wherein the plug further includes a terrace with an edge facing the hammer and a pillar between the hammer and the edge of the terrace, the pillar having a root and a tip that is engaged with the hammer, the pillar engaged with the hammer preventing the hammer from flapping.

5. The optical transceiver of claim 4,
   wherein the pillar is bent with the root as a fulcrum of the bend.

6. The optical transceiver of claim 4,
wherein the hammer provides a pocket that receives the tip of the pillar therein.

7. The optical transceiver of claim 3,
wherein the plug has a center wall and two slabs, the slabs extending from respective ends of the center wall, the center wall and the slabs forming a cross section of an H-shape.

8. The optical transceiver of claim 7,
wherein the latch extends from one of the slabs.

9. The optical transceiver of claim 7,
wherein each of the slabs has ribs in respective ends thereof, the ribs being crushed by abutting against respective inner surfaces of the another of the paired ports.

10. The optical transceiver of claim 3,
wherein the another of the paired ports provides a hollow and the plug provides a knob set in the hollow, the knob determining an insertion depth of the plug into the another of the paired ports.

\* \* \* \* \*